United States Patent [19]

Woods et al.

[11] Patent Number: 4,816,208
[45] Date of Patent: Mar. 28, 1989

[54] ALARM MANAGEMENT SYSTEM

[75] Inventors: David D. Woods, Murrysville; William C. Elm; Melvin H. Lipner; George E. Butterworth, III, all of Monroeville; James R. Easter, Pittsburgh, all of Pa.

[73] Assignee: Westinghouse Electric Corp., Pittsburgh, Pa.

[21] Appl. No.: 829,741

[22] Filed: Feb. 14, 1986

[51] Int. Cl.$^4$ ...................... G21C 17/00; G08B 23/00
[52] U.S. Cl. .................................... 376/259; 376/216; 376/217; 376/248; 364/188; 364/431.01; 340/525
[58] Field of Search ............... 364/200, 518, 521, 188, 364/431.01; 376/248, 259, 216, 217; 340/506, 517, 519, 525

[56] References Cited

U.S. PATENT DOCUMENTS

| | | | |
|---|---|---|---|
| 4,001,807 | 1/1977 | Dallimonti | 364/200 |
| 4,427,620 | 11/1984 | Cook | 376/259 |
| 4,434,132 | 2/1984 | Cook | 376/259 |
| 4,568,513 | 2/1986 | Book et al. | 376/248 |
| 4,608,223 | 8/1986 | Twilley, Jr. | 376/259 |
| 4,632,802 | 12/1986 | Herbst et al. | 376/259 |
| 4,749,985 | 6/1988 | Corsberg | 340/525 |

OTHER PUBLICATIONS

"Nuclear Control Room Annunciators Problems and Recommendations", U.S. Dept. of Commerce NTIS, EG and G Idaho, Inc., Idaho Falls, Sep. 1981.
"Disturbence Analysis Systems", W. Basti and L. Felkel, pp. 451–473.
"A Survey of the Status of and Philosophies Relating to Cockpit Warning System," U.S. Dept. of Commerce NTIS No. N78-13746, George Cooper, 1978.
"A Procedure for Reviewing and Improving Power Plant Alarm Systems", vols. 1 and 2, EPRI NP-3448, Proj. 2011-2, Interim Report, Apr. 1984, MPR Associates, Inc.
"Disturbance Analysis and Surveillance System Scoping and Feasibility Study", EPRI NP-2260, Proj. 891-3, Final Report, Jul. 1982, Westinghouse Electric Corp.
"Automatic Diagnosis of Multiple Alarms for Reaction Control Rooms", Kris L. Gimmy & Enno Nomm, E. I. DuPont de Nemours & Co., South Carolina, Jun. 6–11, 1982.
"Discriminate Display Support for Process Operators", L. P. Goodstein, Riso Nat'l. Laboratory, Denmark, pp. 433–449.
"An Integrated Display Set for Process Operators", L. P. Goodstein, Riso Nat'l. Laboratory, Denmark, pp. 63–70.
"DASS: A Decision Aid Integrating the Safety Parameter Display System and Emergency Functional Recovery Procedures", EPRI NP-3595, Proj. 2402-2, Final Report, Aug. 1984 Combustion Engineering, Inc.

(List continued on next page.)

Primary Examiner—Salvatore Cangialosi
Attorney, Agent, or Firm—D. C. Abeles

[57] ABSTRACT

A hybrid parallel/serial alarm management system in which sensor signals are intelligently processed to produce abnormality indication signals. The abnormality indication signals are divided into groups defined by functions of the system being monitored and are used to generate abnormality messages according to goal violation, process disturbance and process unavailability requirements for each function. Within each goal, process and support category the messages are ranked according to a predetermined local priority and chronologically within the same priority. Each function includes a spatially dedicated parallel display location which displays the highest priority portion of each category of messages associated with each function. The messages not displayed on the parallel display are displayed on a serial display unit in ranked order by category within function. Each time message space becomes available on the parallel display unit within a category, the next message with the highest priority within that category moves onto the parallel display.

12 Claims, 13 Drawing Sheets

OTHER PUBLICATIONS

"A Comparative Simulation Study of Annunciator systems," H. Kragt, *Economics*, 1984, vol. 27, No. 9, pp. 927-945.

"Evaluation of a Conventional Process-Alarm System in a Fertilizer Plant," H. Kragt & J. Bonten, IEEE Trans. On Systems, etc., vol. SMC-13, No. 4, Jul./Aug. 1983.

"Use of Flow Models for Automated Plant Diagnosis", Morten Lind, Human Detection and Diagnosis of System Failures, Plenum Pub. Corp., 1981, pp. 411-432.

"Response Trees and Expert Systems for Nuclear Reactor Operations", EG and G Idaho, Inc., U.S. Dept. of Commerce NTIS, Mar. 1984.

"Power Station Control Room and Desk Design Alarm System and Experience in the use of Cathode-Ray-tube Displays", Int'l. Symposium on Nuclear. Power Plant Control Instruments, 1978, vol. 1, pp. 209-223.

"Human Factors Review of Nuclear Power Plant Control Room Design", EPRI NP-309, Proj. 501, Final Report, Mar. 1977, Lockheed Missiles & Space Co., Inc.

"Visual Momemtum: a Concept to Improve the Cognitive Coupling of Person and Computer" David D. Woods, Int. J. Man-Machine Studies 21, 1984, pp. 229-244.

Andow, "Expert Systems in Process Plant Fault Diagnosis", I. Chem. E. Symposium Series No. 90, 1984, pp. 48-59.

Goodstein, "An Integrated Display Set For Process Operators", Analysis, Design & Evaluation of Man-Machine Systems, Pergamon Press, 1983, pp. 63-68.

Lees, "Process Computer Alarm and Disturbance Analysis: Review of the State of the Art", Computers and Chemical Engineering, vol. 7, #6, 1983, pp. 669-694.

Visuri et al., "Technical Note: Handling of Alarms Using Logic", Nuclear Safety, vol. 23, No. 5, Sep.-Oct., 1982, pp. 559-562.

Visuri, "Multivariate Alarm Handling and Display", OECD Halden Reactor Project, N-1750, Halden, Norway, pp. 598-607, (1982).

ALARM MANAGEMENT SYSTEM

BACKGROUND OF THE INVENTION

1. Field of the Invention

The present invention relates to an alarm management system for process control systems such as nuclear power plants and, more particularly, to a system which improves the strength of the evidence of an abnormality expressed by an abnormality indicator, which organizes the abnormality indicators and corresponding abnormality messages within a local priority by plant function and which includes a hybrid parallel-serial alarm message presentation method, in which variable wording abnormality indication messages appear in spatially dedicated locations to produce a disturbance board. The alarm messages within each function of the plant take the form of goal violation, process disturbance and process unavailability messages.

2. Description of the Related Art

Fault management, the identification of and response to abnormal conditions, is a major component of a human's role in many complex technological environments such as process control, flight decks and air traffic control. Operational history design reviews and evaluation studies have shown a large number of major deficiencies with traditional systems particularly with respect to the operator's role. These deficiencies are rarely due to a lack of alarm data; rather, they are the result of problems in finding and integrating the relevant data out of a much larger set. In other words, the alarm problem is an example of the significance of data problem.

The significance of data problem represents an inability to find, integrate, or interpret the "right" data at the "right" time (e.g., critical information is not detected among the ambient data load, or not assembled from data distributed over time or space, or not looked for due to misunderstandings or erroneous assumptions). This problem occurs in situations where a large amount of porentially relevant data must be sifted to find the significant subset for the current context. In other words, most information handling problems are not due to a lack of data but rather due to an overabundance of unorganized data.

Operational staff members in dynamic process environments must detect, evaluate and respond to abnormal conditions. Traditionally, operators must sift through large numbers of what are traditionally called "alarm" messages to find and identify the abnormal conditions that are indicated by "alarms". Conventional alarm systems complicate the operators task by producing alarm signals which are triggered when signals cross thresholds crossing type events which provide weak evidence with respect to underlying abnormal conditions. The alarms are organized according to system thereby requiring that the operator understand the relationships between components in various systems and the multiple functions they perform to determine whether the triggering events indicate an abnormality. Conventional alarm systems presentation methods range from completely parallel to totally serial. The parallel presentation systems complicate the operators task because the number of alarms presented can overwhelm the operator with messages, even though they there are advantages to presenting all the alarms at once. On the other hand, the serial presentation systems limit the number of messages yet complicate the operators integration problem because the operator must scan a long list of alarms one page at a time to ferret out the relevant ones. The task of the operators in interpreting the evidence provided by these weak "alarms" is difficult because (a) the meaning of a particular alarm message depends on context, for example, plant mode, message history and the status of other messages and (b) the individual alarm messages must be selected and integrated to assess process status since each message is only a partial and indirect indicator of an abnormality. Operator performance literature is full of cases where operators failed to correctly find, integrate, and interpret typical alarm messages in order to identify and respond to disturbances.

Failure to recognize the above-discussed problems has led to computerized alarm systems which fail to improve or even exacerbate alarm system deficiencies because of a proliferation of types and degrees of "alarm" messages.

FIG. 1 illustrates the conventional approach for alarm systems used in nuclear power plants. The nuclear power plant is monitored by devices such as a level sensor 10, a flow sensor 12 and a valve position sensor 14. The outputs produced by these indicators are evaluated by signal monitoring units 16 which include threshold or set point detectors 18–22. Each detector 18–22 monitors a single sensor and produces an "alarm" signal that provides weak evidence of an abnormality. For example, an alarm in this type of system might signal that a valve is closed. Under one set of plant conditions, this valve position may be abnormal, i.e., no flow even when the system of which the valve is a part should be on. Under other conditions, it may not indicate an abnormality. The alarm signals are generally organized along system lines that reflect how components are arranged and reach display 24 grouped according to such systems, as illustrated in FIG. 1. The display 24 consists of backlit annunciator tiles each having a fixed wording message, and presents all of the "alarms" in parallel according to the system groupings. Each time a monitored piece of equipment crosses a threshold, a title is turned on or off indicating that the threshold was crossed. In such a system there is a problem in integrating these kinds of alarms into an overall understanding of plant state. The parallel presentation via the tiles allows the operator the possibility to get a "picture" of the operation of the entire system, yet it can overwhelm the operator when a major system disturbance occurs.

FIG. 2 illustrates in block diagram form one prior art attempt to tackle the alarm organization and presentation problem presented by the system illustrated in FIG. 1. In this system, once the "alarm" signals are produces (triggered) by the threshold detectors 16, they are organized into two or more groups in an absolute prioritization scheme by a dedicated prioritizer 26 which can be a computer. All the alarms for the system being monitored are sorted at the same time into the predetermined groups based on arbitrary assumptions and judgments made by the system designer, at the time of alarm system design, which generally do not hold for all possible plant conditions. The fixed organization based on plant systems is inadequate because the significance of this type at alarm signal is context dependent, as in the system of FIG. 1. Once the alarms are organized they all are presented on either a parallel display 28 including an arbitrarily limited number of backlit tiles or on a serial display 30. A plant system oriented presentation grouping arrangement of the backlit tiles effectively limits the number of alarms presented to the operator at one time but does not reduce the total number of alarms presented or increase the strength of the evidence of an abnormality. This system, by allocating the "lesser important" alarms to the serial display, makes the alarm system less sensitive to small disturbances since they must be searched for by the operator using the serial display 30.

FIG. 3 illustrates another attempt to solve not only the alarm organization and presentation problem but the problem associated with the strength of evidence of each alarm with respect to underlying abnormalities. The threshold detectors 16 produce the "alarm" signals which are applied to filter logic 32. The filter logic 32 can be any type of logic system which analyzes the old alarms to produce new alarms which increase the strength of the evidence of an abnormality. For example, the filter logic 32 could combine all the sensor signals for a tank to produce a new alarm which indicates that the tank level is about to cause a problem, thereby providing an indication of a pending actual abnormality. The logic can be dedicated logic circuits such as AND and OR gates. The new alarms thus produced are assigned one of two priority values by a two level prioritizer 34 in dependence on severity and are then applied to a system segregation filter 36. The filter 36 sorts all alarms by plant system and changes the color of the particular alarming system from green to yellow (priority level 2) or red (priority level 1) on a system summary display 38 which displays plant schematic diagrams. At the same time, the filter 36 also generates and displays an alarm message on serial display 40. That is, the system of FIG. 3 produces alarms on both displays 38 and 40. When an operator sees a particular sensor flashing, for example, red, on the summary display unit 38, the operator must go to the serial display unit 40 to determine the specific alarm from that priority class for that plant system that triggered the indication in the schematic diagram. This system, even though it may reduce the number of alarms indications by creating "new alarms", nevertheless suffers from the same problems as a serial system since the operator must scan a list of alarm messages to determine the meaning of a flashing symbol on a schematic system diagram.

SUMMARY OF THE INVENTION

An object of the present invention is to provide an alarm management system which does not overwhelm the operator with alarm indications for a process control system being monitored yet alerts the operator to the underlying abnormalities, presents the abnormalities within a context clearly relating the abnormality to the total state of the plant and clearly states the exact abnormality.

It is another object of the present invention to increase the strength of evidence of an abnormality produced by triggering event.

It is another object of the present invention to alert the operator to the most relevant abnormality within a defined plant context and alert him to lesser relevant abnormalities as the more relevant problems are solved and thus maintain sensitivity to minor disturbances.

It is a further object of the present invention to provide a parallel display of the most important goal, process and support category messages within each plant function ranked within each category and a serial display on which all remaining messages are displayed by category where the ranking is maintained.

It is an additional object of the present invention to give the operator a visual picture of the entire plant state from the spatially dedicated locations of alarm messages in the control room.

The above objects can be accomplished by a system which processes sensor signals using an intelligent rule based process to produce abnormality indicators which provide strong evidence of an abnormality. The abnormality indicators are then organized according to the function of the process being monitored and within each function the alarms are sorted into alarms relating to violations of the goals of the function, disturbances the process currently accomplishing the goals and unavailability of the processes which could be used to achieve the goal. Within the categories of goal, process and support, specific messages are generated based on the particular set of plant signals which indicate the underlying abnormality category. The messages are locally prioritized within the goal, process and support categories and output to a display for the particular function. The messages are presented on a parallel display divided according to function and within each function by goal violation, process disturbance and process unavailability. Messages that overflow the space available for parallel display within these categories are kept in a prioritized pop-up stack available for operator review by function category in priority order on a serial display. Lower priority messages are moved onto the parallel display as higher priority problems are resolved, that is, as space becomes available on the parallel display. The functional category display areas are in spatially dedicated positions within the process control monitoring room so that the operators can identify which portions of the process control system are alarming based on the positions where messages occur.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
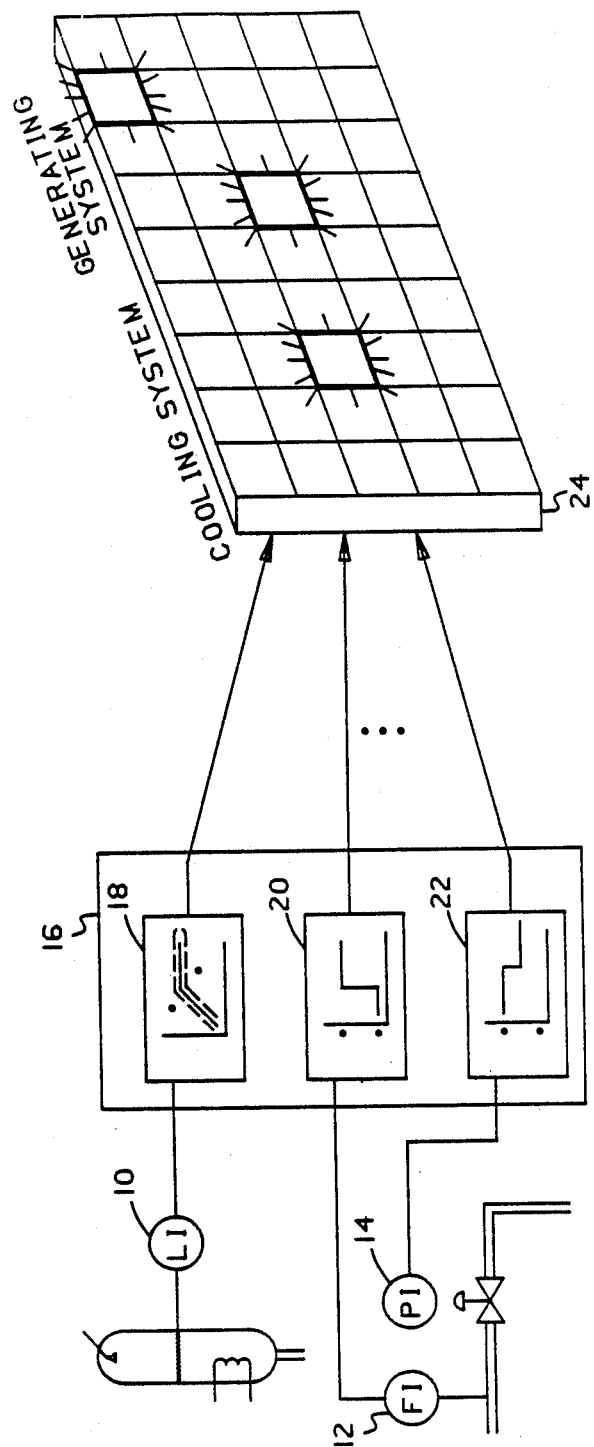
FIG. 1 is a prior art conventional alarm system.
Figure 2:
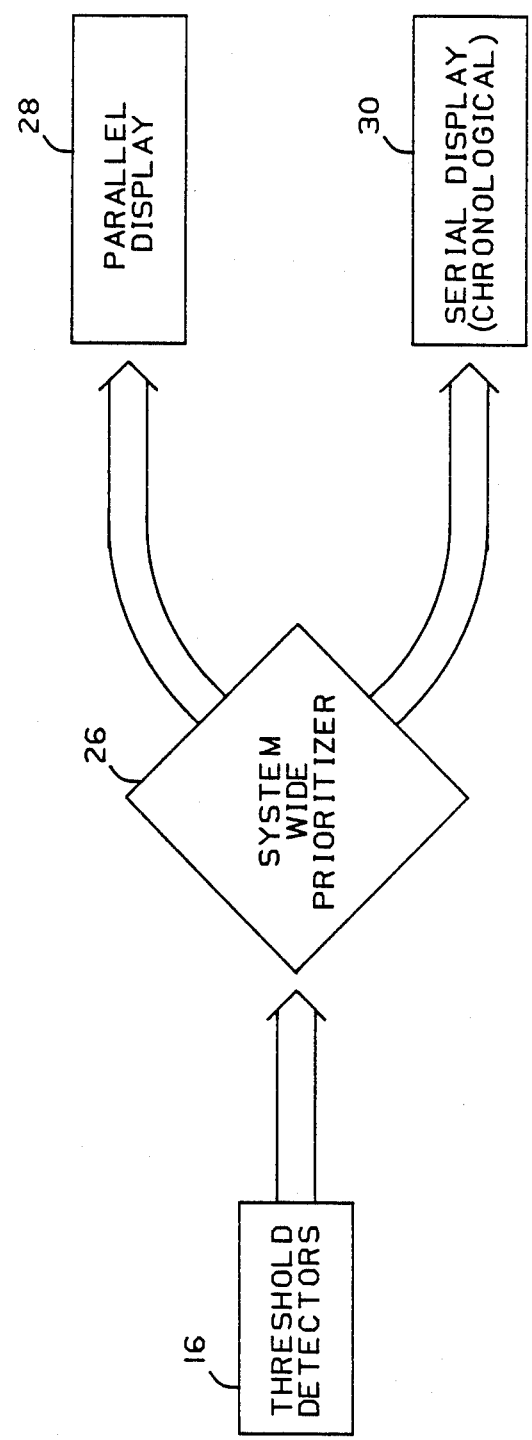
FIG. 2 is a prior art fixed priority computerized alarm system.
Figure 3:
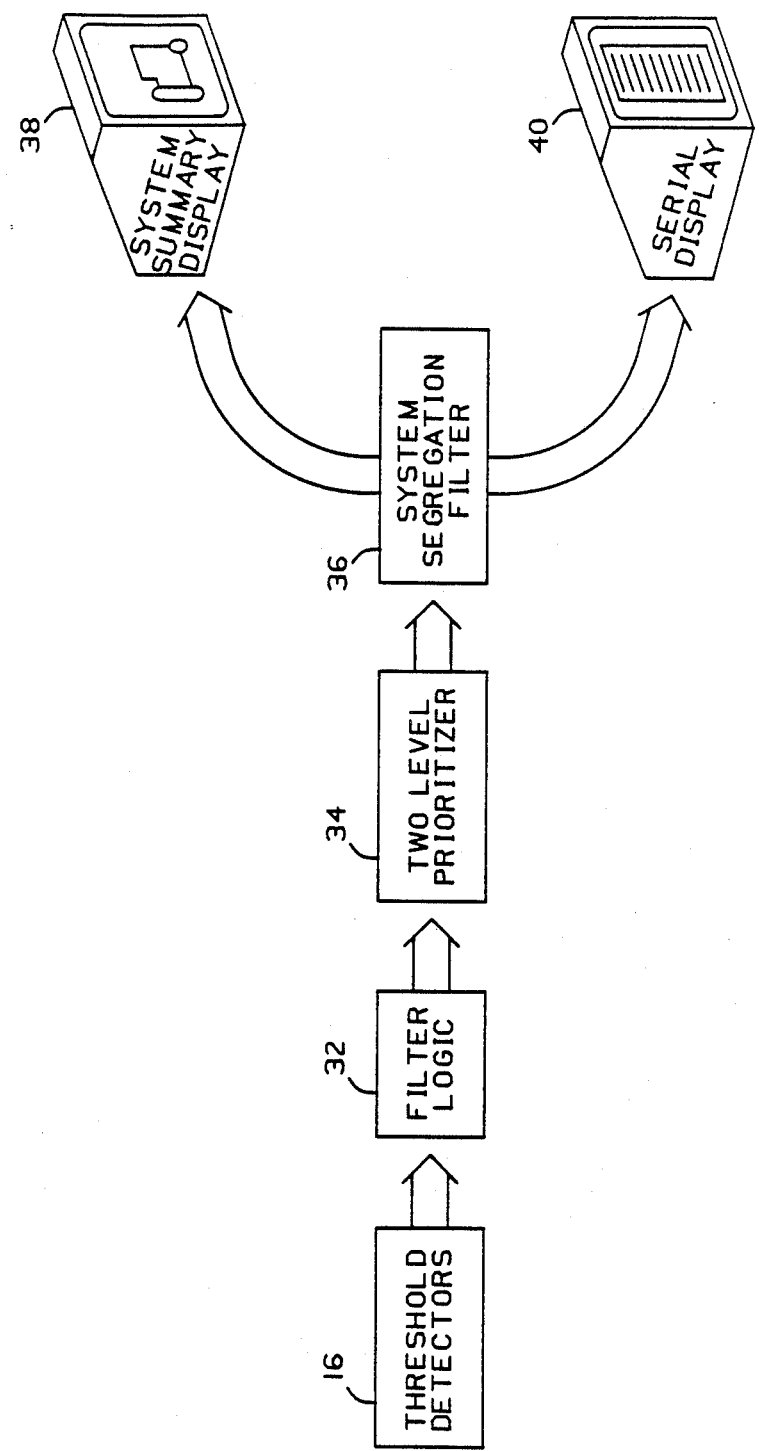
FIG. 3 is a prior art computerized alarm system in which each alarm produces better evidence of an abnormality.

Improved fault management depends on a shift away from messages that are only signals of possible abnormal conditions to abnormality messages that focus on the abnormal conditions (disturbances) that are being signaled. This is basically a problem of defining the units of description and the relationships between those units that are appropriate for fault management tasks. Take the case of valve x which is closed but should be open. The alarm message could simply note that valve x is closed (e.g., a component is misaligned) that is the status of the valve, or the message could signify that with valve x closed, the capability to supply material to the reservoir H via path A is compromised. Or, given other data, it could signify that with valve x closed, the process that is currently active to supply material to reservoir H is disturbed (e.g., reduced flow, no flow). The significance of the unavailability or disturbance in the material flow process depends on the state of other processes such as is an alternative flow process needed or is reservoir H inventory important in the current operating context. This example shows that it is the relationships between a given datum and other data that define the abnormal conditions. The present invention provides the above types of relationship to better define and display information about the abnormalities to the operator.

To obtain stronger evidence of underlying abnormalities so that the data provided to the operator has the desired significance, this invention filters the sensor data to produce abnormality indicators for the functions of the system being monitored.

As indicated by the above-discussed example, an analysis of objective-function-system relationships for any application reveals three kinds of abnormalities that can occur with respect to the status of some function. First, there can be a violation of some limit on the goal of the function. Second, there can be some disturbance in the performance in the active portion (process) of the function. Third, some portion of the process may be unable to perform if called on (the requirements for performing the process or the support facilities for the process are unavailable). In the present invention, to relate the abnormality indicators and their corresponding messages to each other they are organized into system functions and divided into the categories of goal violation, process disturbance and process unavailability messages within each function. The grouping of alarm messages by function provides a first level of organization of the abnormality messages and the grouping within function into the categories of goal violation, process disturbance and process unavailability provide a second level of organization to provide specific information regarding the abnormality. In effect, each specific abnormal condition in the present invention results in a single message to the operator with three levels of meaning which are inherently integrated for the operator: (1) the highest level of meaning indicates there is a disturbance in function x, (2) the second level indicates that the kind of disturbance is either a goal violation, process disturbance or process unavailability, and (3) the third level indicates the particular abnormal condition that signifies that one of the above is active. This alarm organization within function communicates the significance of a particular abnormal condition in the context of other alarm messages for the same function to the operator. For example, a process unavailability message may be significant, in terms of operator attention, if no other alarms are active; unimportant if the active portion of the function is performing well, the goal is satisfied, and there are other more important conditions requiring operator attention; or significant, in terms of operator action, if the active portion of the function is disturbed. In the present invention, the significance of the relationship between particular messages can be seen against the context or background of the message because of the parallel display type presentation of the state of several plant functions. This level of context is needed to support operator judgment related to the significance of the alarm status of one function relative to other functions. The abnormality message presentation technique, according to the present invention, spatially organizes messages by function so that the operator has the capability to directly "see" disturbances in the topology of plant objectives/functions/systems, rather than see a change in plant sensors or components that must be selected, integrated, and interpreted to determine the set of active disturbances. The fundamental display concept of the present invention is to show current disturbances and their relationships on a disturbance board. This kind of information generation and display aids the operator in defining and progressively limiting his field of attention to the important disturbances for the current operating context.

The presentation technique of the present invention is a hybrid serial-parallel spatially dedicated approach and is based on two criteria: (1) an organized, high level description of disturbances in terms of the abnormality categories is provided such as the description provided by the objective-function-system topology; and (2) a direct link exists between messages on specific abnormal conditions and the high level categories to which the specific messages belong. In particular, a basic message format that meets these criteria is <category>-:<specific abnormal condition>. In the present invention, the high level categories within a function have a limited number of spatially dedicated locations (display slots). The total set of active abnormality messages within a particular category compete for limited display space (display slots) on the parallel display. The number of message slots available within a category can be varied by the system designer to accommodate the number or expected density of messages in the category of disturbances and to achieve a balance between the number of relevant messages and the visual burden on the operator caused by the number of messages displayed. Those messages which are not displayed on the parallel display are accessible by category (in priority order) on a serial display. Any messages available for review on the serial display can move onto the parallel display whenever a display slot becomes available.

One way to describe the approach of the present invention to alarm presentation is to characterize alarm systems in terms of two parameters: (1) N the total number of spatially dedicated locations, and (2) M the number of messages that can occur for a given location. In a conventional system, as illustrated in FIG. 1, M is equal to one and N is equal to the total number of possible alarms. In a totally serial presentation system such as chronological alarm lists, N is equal to one and M is equal to the number of possible alarms. Experience has shown that fault management performance is poor when these extremes constitute the primary alarm system. The power of the hybrid serial-parallel approach discussed herein is that it allows the alarm system designer to set N and M to intermediate values based on analysis (i.e., the levels and units used to describe disturbances) and on experience (i.e., tests of operator performance of fault management tasks can be used to tune the level of dedicated locations), and it allows the designer to scale a single, basic concept and implementation to other design constraints or applications. The key to the present approach to fault management is to use the units from the analysis of objectives-functions-systems to build an information space at two levels: a high level view of the abnormal status of a plant function in the context of the abnormal status of other functions, and a view of the specific abnormal conditions within a function in the context of what the function should achieve and what it needs to work properly. When these levels of organization are linked to a spatial display mechanism, i.e., the disturbance board, the operator is able to view alarm data in a functional context and thereby better extract the significance or meaning of this data to enhance fault management performance and allow the operator a better understanding of plant state.

Figure 4:
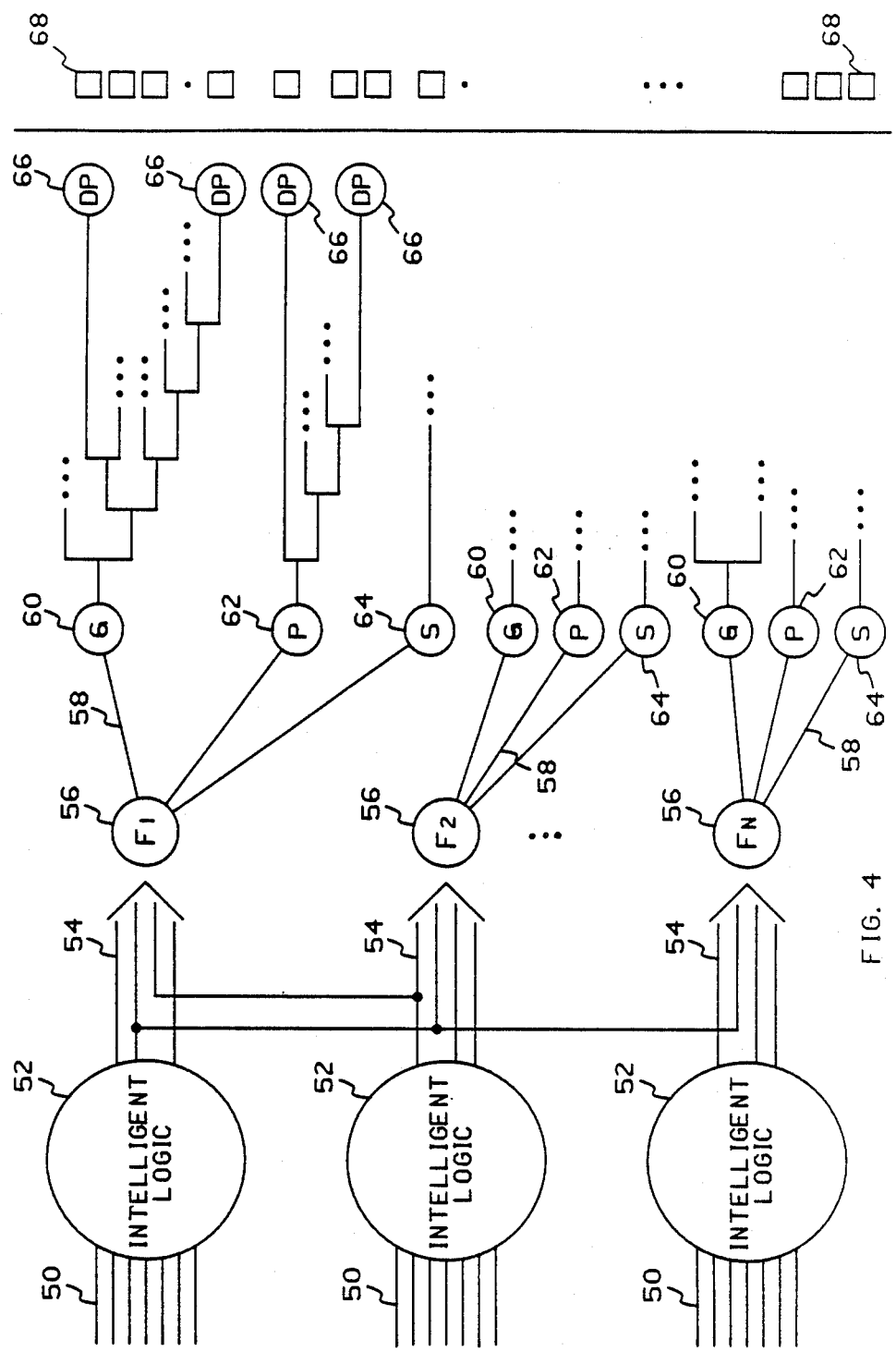
FIG. 4 is a diagram illustrating the general concepts of an alarm management system according to the present invention.

FIG. 4 is a conceptual diagram of the operation of the present invention. Sensor signals 50 are applied to intelligent logic nodes 52 which produce abnormality indication signals 54. The abnormality signals 54 are routed to different function nodes 56. Messages 58 relating to the goals, processes and support associated with each function 56 are produced and routed to the appropriate goal violation node 60, process disturbance node 62 and process unavailability node 64 category. The relationships between the functions can be expressed by the following hierarchy:

| Goal 1:         | Provide X             |
|-----------------|-----------------------|
|                 | ↑                     |
| Means 1:        | Function A - Process 1|
|                 | ↓                     |
| Requirement 1/  | Needs Y               |
| Goal 2          | Provide Y             |
|                 | ↑                     |
| Means 2:        | Function B - Process 2|
|                 | ↓                     |
| Requirement 2/  | Needs Z               |
| Goal 3:         | Provide Z             |
|                 | ↑                     |
| Means 3:        | Funcion C - Process 3 |

The functions and categories are arranged in a hierarchy dictated by the functions of the system with the most global function having the highest ranking. The functions overlap in that the requirements for one function can be the goals for a lower level function.

Returning to FIG. 4, the tree branching to the right of each category node 60-64 indicates that, each goal process or support category can have sub-categories that are significantly important to warrant a dedicated display position (DP) node 66. All of the abnormality messages related to a particular category or subcategory are routed to the particular display position node 66. Associated with each display position node 66 are display slots 68 or spaces each of which can hold a single abnormality message. As can be seen from FIG. 4, each display node 66 has at least one slot 68 and can have as many parallel display slots 68 as desired by the designer. The current set of abnormality messages within that category or subcategory are ranked within category according to what the message indicates about the category, for example, according to severity. As a result, ranked messages compete for limited display space where a higher priority message will come in and displace a lower ranked message on the parallel display. Any overflow messages of the parallel display are routed to a serial display (not shown) where they are maintained by category within function and retain their priority ordering. In addition, as the higher ranked messages displayed in the parallel display slots 68 are removed because the associated abnormality has been cured, a lower priority message from the serial display will move onto the parallel display. As a result, in the system according to the present invention, the abnormalities with the greatest effect or magnitude are always displayed for the operator in parallel and when there are no serious plant disturbances, the sensitivity of the system is very high to minor disturbances since even the most minor disturbances will rise to the parallel display slots 68.

Figure 5:
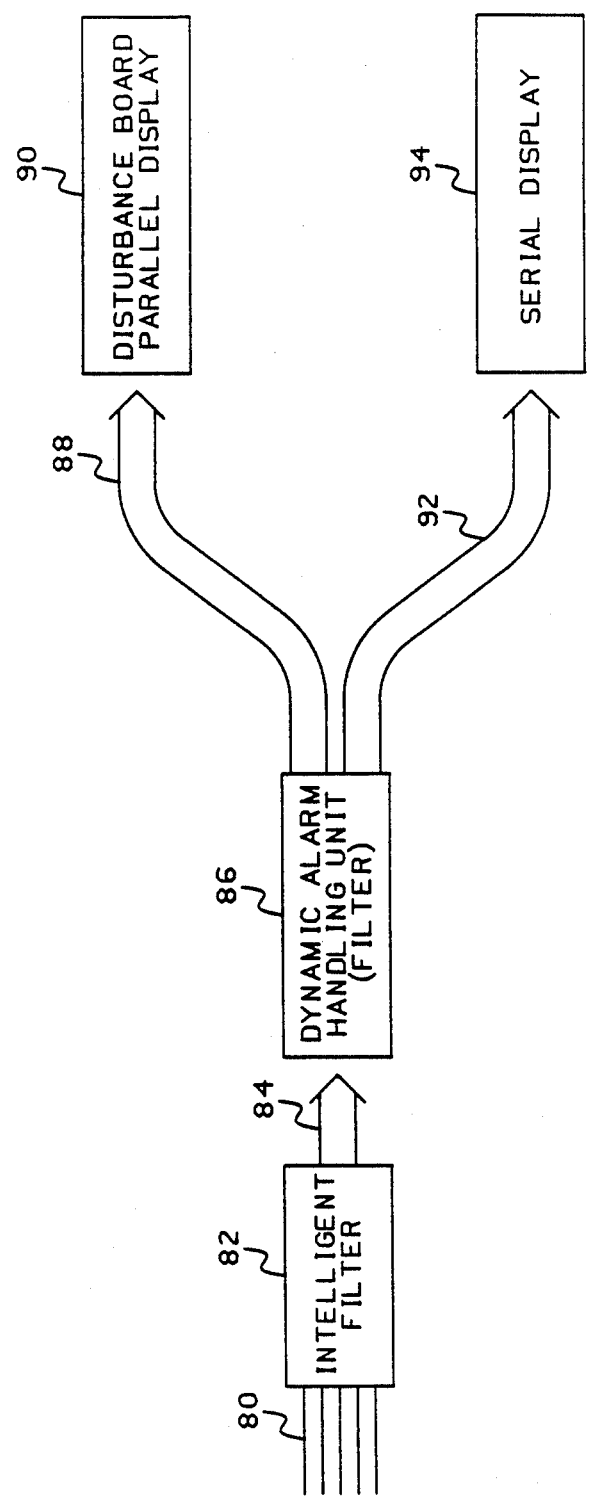
FIG. 5 is an overview diagram of the structure of the present invention.

FIG. 5 is a block diagram of the structure of the present invention. As illustrated in FIG. 5, sensor signals 80 are input to an intelligent filter 82 which processes the sensor signals 80 to produce abnormality indication signals 84. The abnormality signals 84 can be produced by hardwired logic functions such as OR and AND logic circuits or preferably by a rule based artificial intelligence type system which produces indicators that provide strong evidence of an abnormality. For example, a rule based system would produce set point status data (threshold crossing data) for the sensor signals, determine whether a process should be active when it is active, determine whether a process can work if required if it is inactive, compare what automatic controls are doing with what they should be doing and generally filter the sensor signals to produce abnormality indication signals 84 which indicate an abnormality rather than just the state of a particular device such as a valve.

The abnormality indicators are applied to a dynamic alarm handling unit 86 which produces abnormality messages, sorts the messages into the appropriate display category as depicted in FIG. 4 and locally ranks them according to priority within category. The dynamic alarm handling unit 86 (FIG. 5) also determines how many messges 88 within each category can be displayed based on the number of display slots for that category on a disturbance board 90 and routes those messages to the disturbance board 90. All currently active messages 92 are displayed on the serial display 94 by category with their ranking or priority maintained. The serial display messages 92 conceptually remain in a pop-up type stack, so that they can be transferred to the parallel display 90 as space becomes available thereon.

Figure 6:
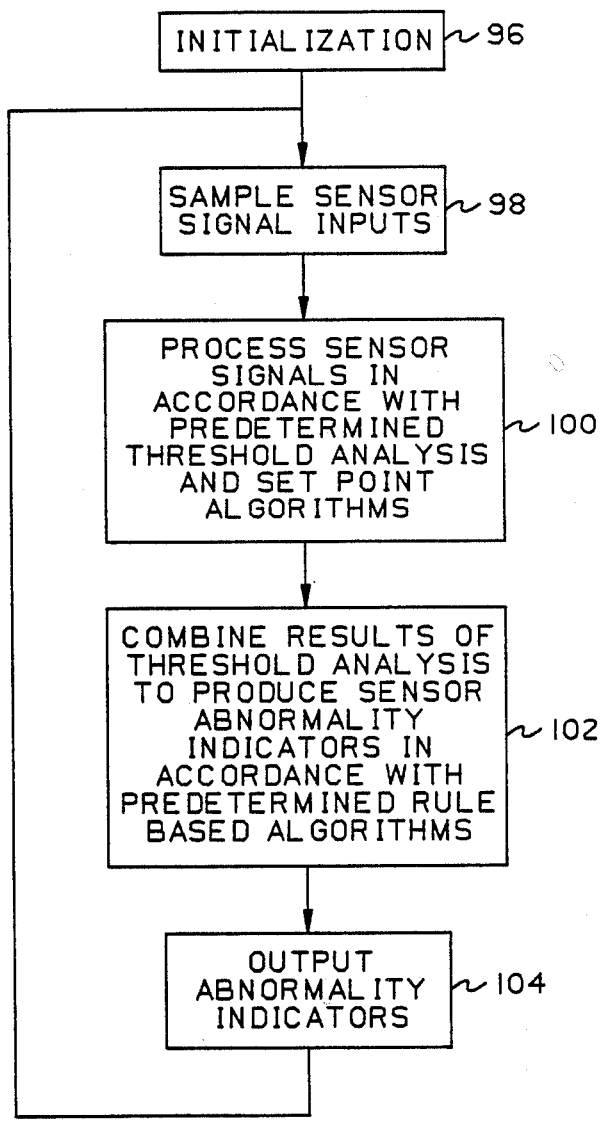
FIG. 6 is a flowchart for the process performed by the filter 40 of FIG. 5.

FIG. 6 is a generalized flowchart for the processing which occurs in the intelligent filter 82 of FIG. 5. Once initialization 96 is completed, the filter 82 samples 98 the sensor signal inputs 80. The sensor signal inputs 80 are processed 100 in accordance with predetermined threshold type algorithms which compare sensor signals to predetermined ranges and produce an output whenever a particular condition or conditions are met. The details of the predetermined threshold analysis algorithms can be provided by one of ordinary skill in the art in accordance with the particular system being monitored. The results of threshold analysis are combined 102 to produce the abnormality indication signals. The process of combining can be as simple as using logic functions such as AND and OR, however, as previously discussed, it is preferred that a rule based artificial intelligence system be used, so that the alarm indications can be inferences about events happening in the system being monitored. A rule based programming system suitable for such intelligent filtering can be obtained from Carnegie Group International and are called OPS5. Other systems which are suitable are available from Tekknowledge. A person of ordinary skill in the art could adapt the intelligent filtering system selected to the particular process being monitored by producing the necessary rules which would fire whenever all the necessary conditions for the rule are met.

Figure 7:
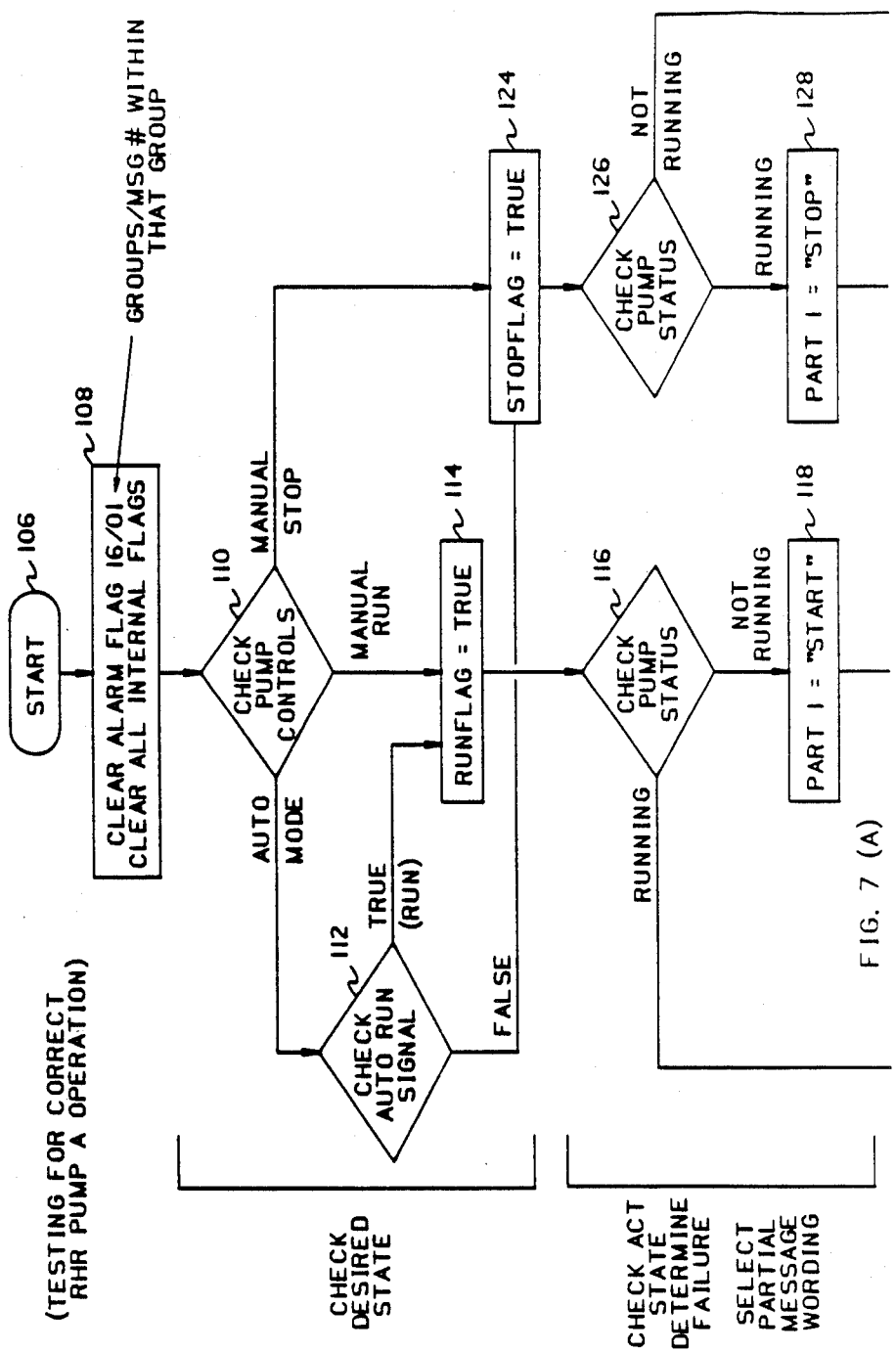
FIGS. 7A and 7B depict a detailed flowchart of one way of producing an abnormality indicator by the filter 40 of FIG. 5.
Figure 7:
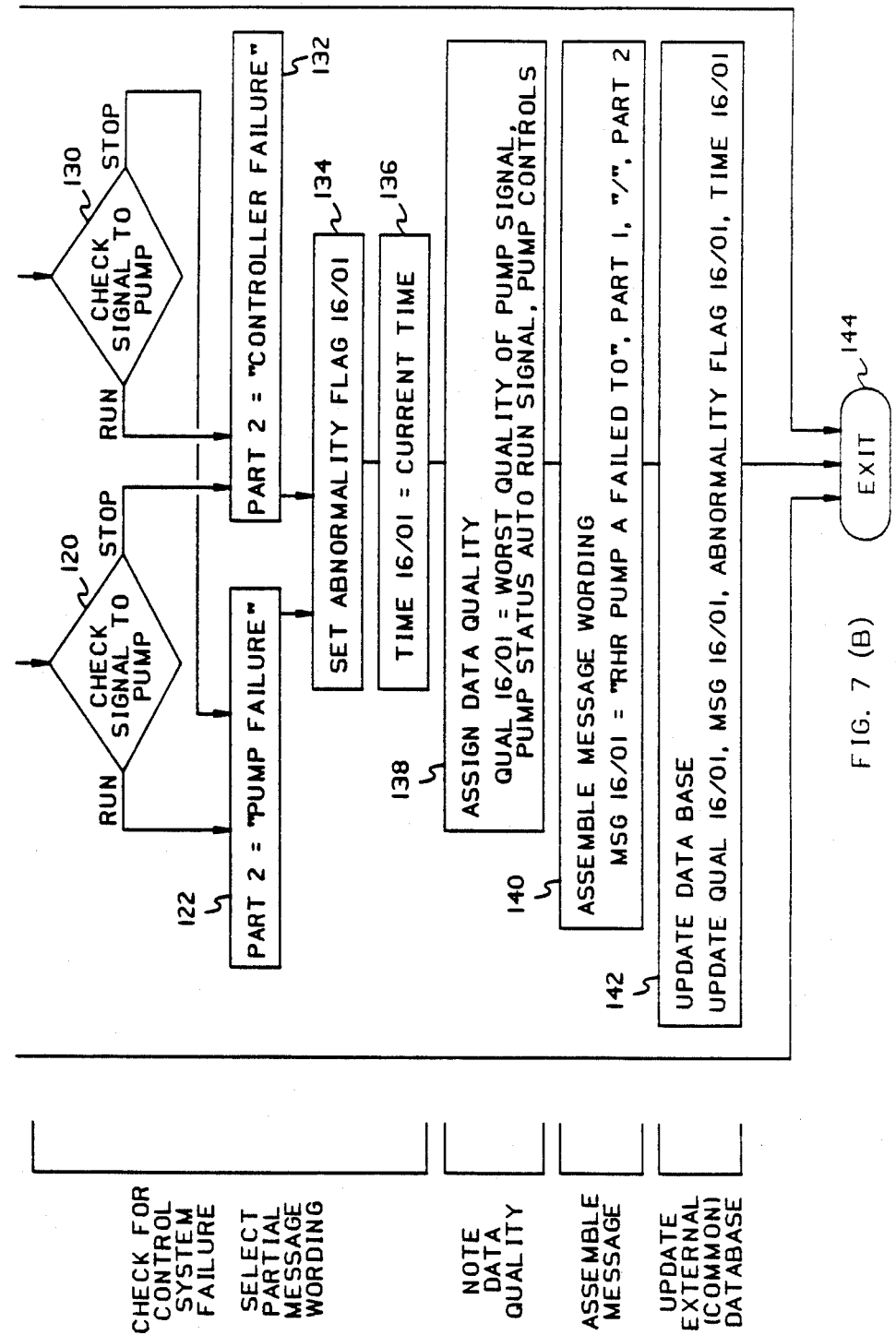

An alternative to such rule based intelligent filtering is to hard code sophisticated algorithms to produce the abnormality indicators. FIGS. 7A and 7B depict a detailed example of such an algorithm for producing pump abnormality indicators and associated messages in a nuclear power plant. The production of such a flowchart and the corresponding computer program is within the skill of the ordinarily skilled in the art. Such an approach, however, would be more expensive and less flexible than the preferred rule based approach.

Figure 8:
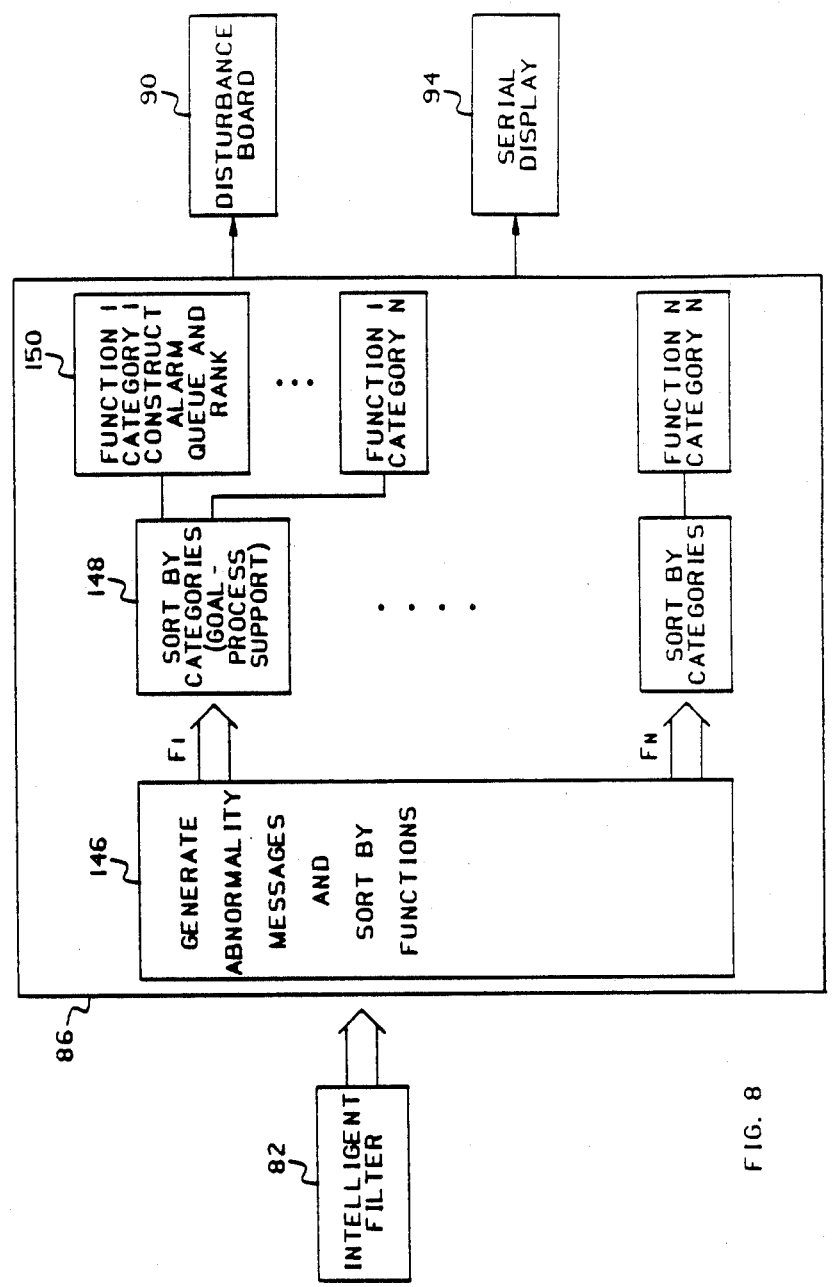
FIG. 8 illustrates the details of the dynamic alarm handling unit 86 of FIG. 5.

When the intelligent filter 82 has produced the abnormality indication signals or the actual messages they are transmitted to the dynamic alarm handling unit 86, the conceptual details of which are shown in FIG. 8. First the signals are used to generate abnormality indication messages (if the messages have not already been generated) and these messages are sorted by plant function 146. The function messages are then sorted 148 by category, that is, by goal violation, process disturbance and process unavailability. An abnormality message queue is then constructed for each category and the messages are ranked 150 within that queue. The ranking can be by any desired criteria such as severity of the message with respect to the process being controlled or some other priority scheme. Within each queue, messages of equal rank can be ordered by chronology or some other scheme. When the prioritization is complete, the number of messages which will fill the available number of messages slots on the disturbance board 90 are routed to the disturbance board 90. All of the remaining messages are made available for display on the serial display 94 by category with their ranking maintained.

Figure 9:
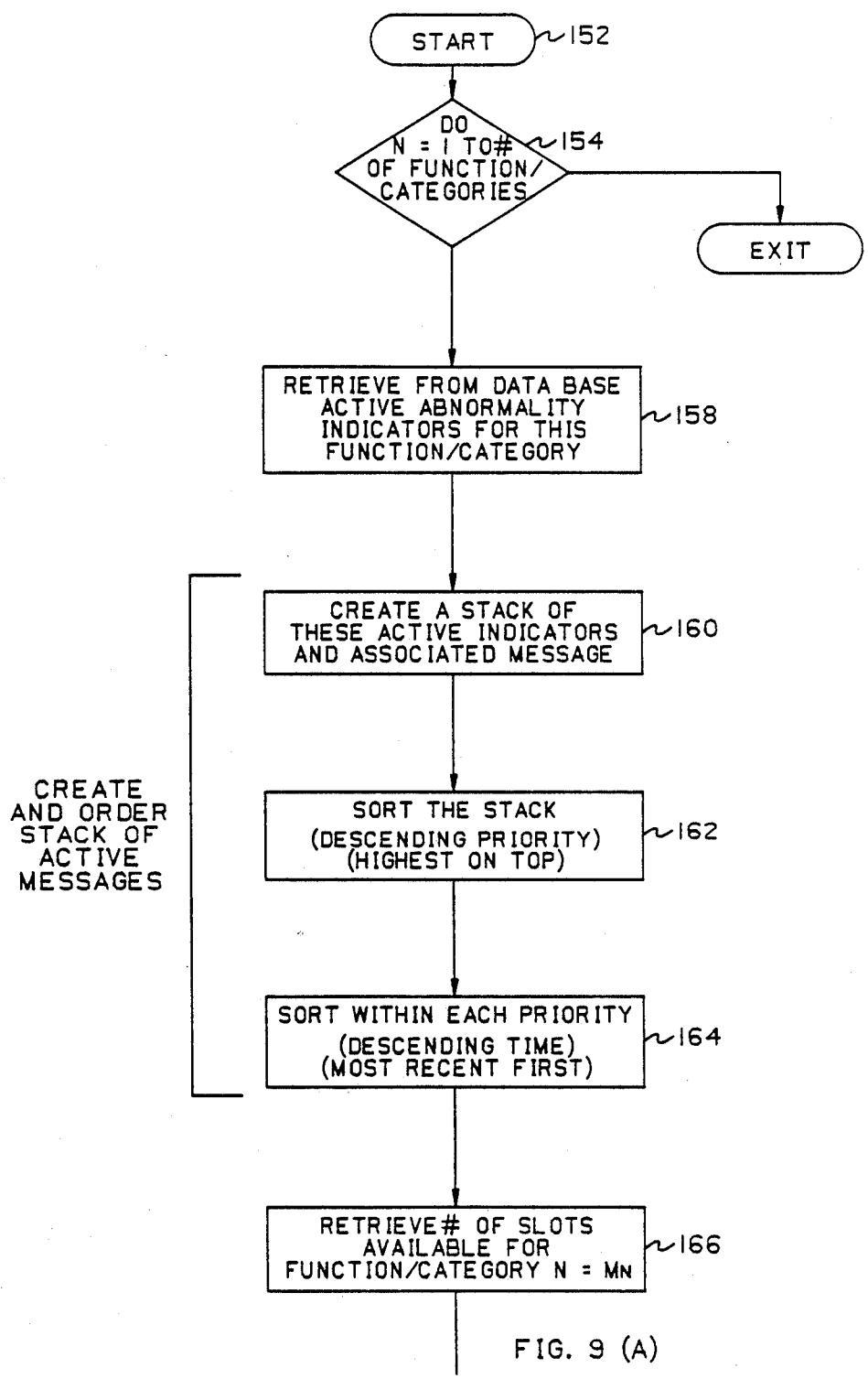
FIGS. 9A and 9B depict a flowchart of the processing by the dynamic abnormality handling unit 86 of FIG. 8.
Figure 9:
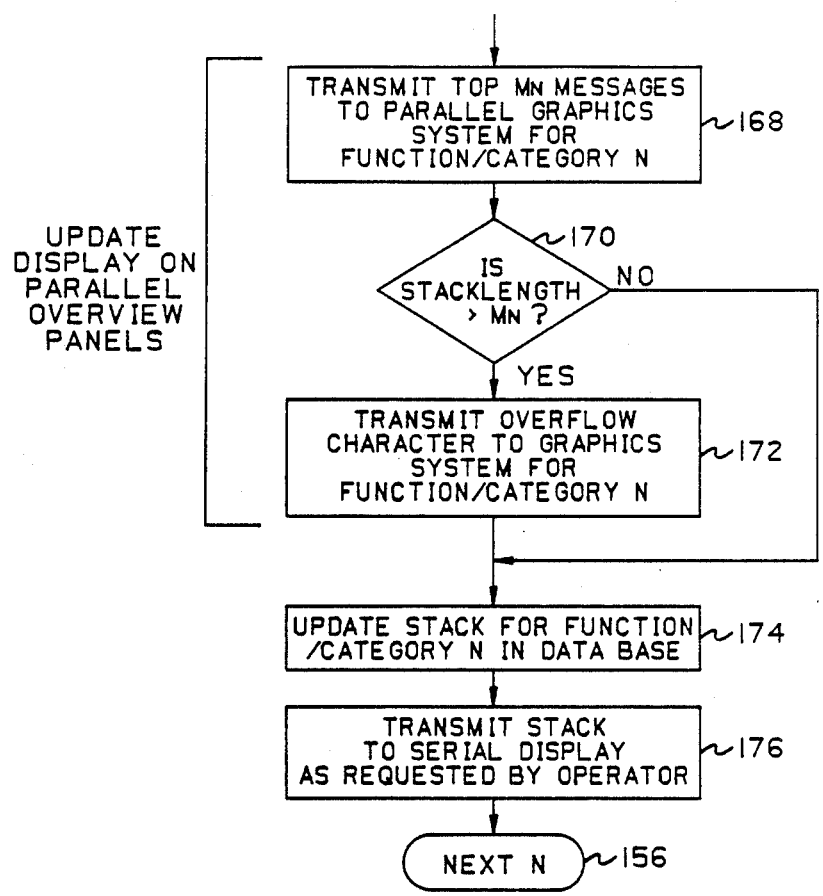

FIGS. 9A and 9B depict an example of a flowchart for an executive routine which can execute the function message processing of FIG. 8. In this method, each abnormality indication signal is provided, by the intelligent filter 82, with a predetermined tag that indicates function and category within function for each abnormality, that is, the function and category sorting that is described with respect to FIG. 8 is explicit in the abnormality indicator. The executive algorithm operates within a do loop 154–156 that serially processes each function/category. Within the loop abnormality indication data is retrieved 158 and a stack of message indicators and associated messages is created 160. The stack is then sorted 162 according to priority and then sorted within each priority chronologically 164. Next the system retrieves 166 the number of slots available in the parallel display unit 90 associated with that particular function/category and transmits 168 a portion of the stack to the parallel display 90. The number of messages transmitted to the parallel display 90 depends on the available number of display slots for that particular function/category. If the stack length is greater than the available number of slots in the parallel display 90, an overflow character is transmitted 172 to the parallel display 90 to inform the operator that additional messages within this category are available on the serial display 94. If the stack increases in size from the last message production cycle, another indicator called an overflow addition indicator can also be sent to the parallel display to indicate to the operator that a new message has been added to the serial stack. Such an indicator lets the operator know that something else has happened and he can then go look on the serial list for the new message if desired. Then the stack is updated 174 in the data base. If the operator has indicated a desire to view the queue of messages for a category, then the stack is transmitted 176 to the serial display 94. Since the messages are maintained according to functional/category the operator can call up and display those messages associated within a particular function and category (goal violation, process disturbance and process unavailability).

Figure 10:
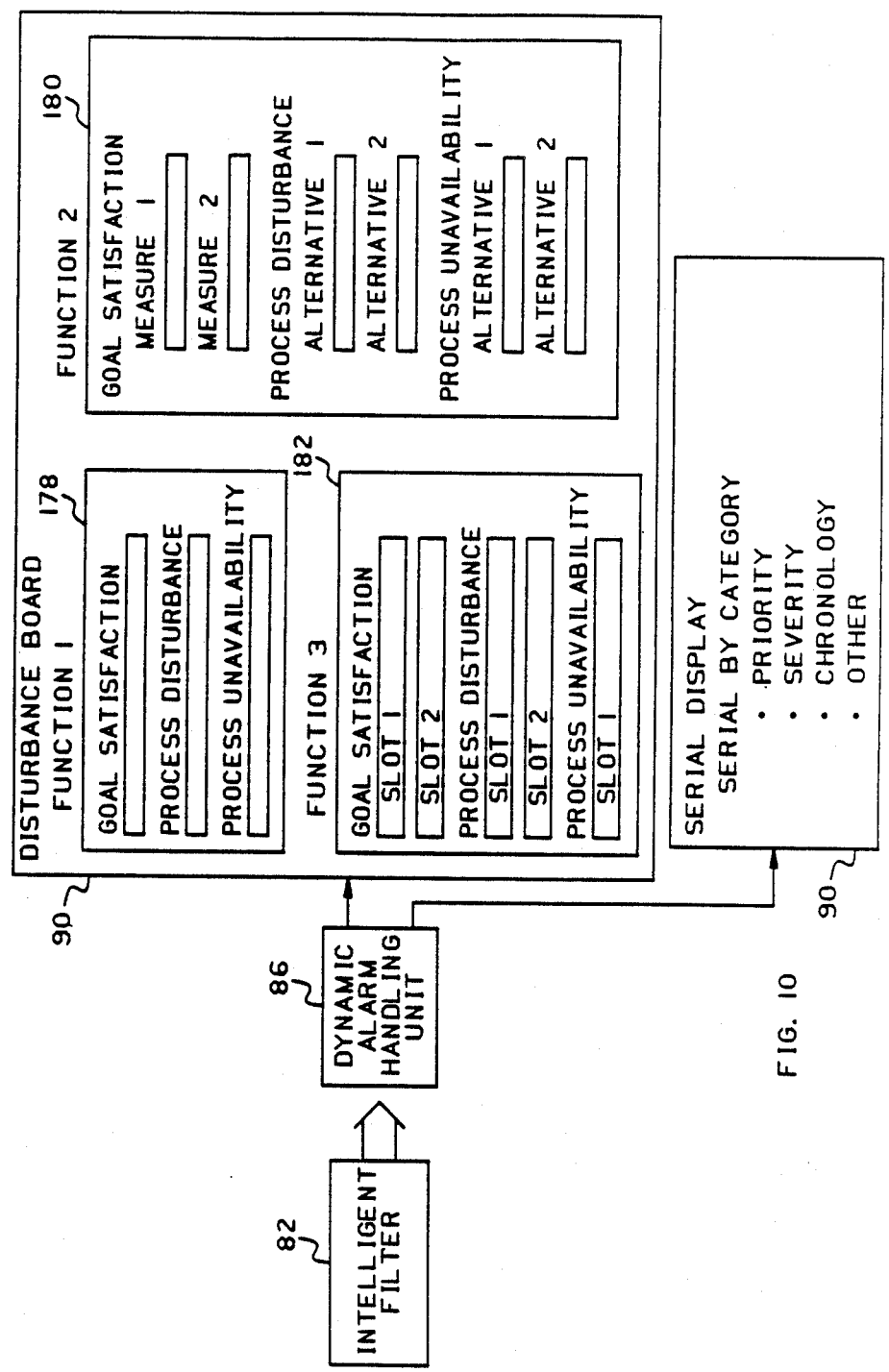
FIG. 10 illustrates the displays 90 and 94 of FIG. 5 in more detail.

FIG. 10 illustrates the details of the parallel 90 and serial 94 displays. The disturbance board 90 provides an example including a spatially dedicated function display 178 which has only one display slot for each message category, a function display 180 which has dedicated display slots for subcategories within the main categories function and a function display 182 which has multiple display slot categories within each category (goal violation, etc.) which allow multiple messages from the queue for that category to be seen in parallel. The serial display 94 indicates the set of possible orderings of messages within a category that could be requested. The messages can be listed priority order, severity chronology or some other ordering such as equipment accomplishing the function.

There are two aspects to the concept of the present invention for intelligent support of fault management as represented by the prior discussion, the structural and the dynamic. The first is the goal-directed structure used to organize individual alarms into meaningful units.

The unit of the goal-directed analysis (or function) consists of a goal-to-be-provided and the process that can provide the goal. A function can be decomposed into (1) the elements that capture how the process works to achieve the goal (e.g., a material transport process consists of: sources/sinks and transport mechanisms and entry/exit points), (2) the alternative processes or process elements that could achieve the goal (e.g., there are two water transport processes that could supply water to a reservoir). In addition, subcategories can exist because there can be a multiple partially independent data sources that indicate the state of a goal, process or process element (e.g., two independent parameters that indicate goal satisfaction).

The goal-directed representation also aids fault management by directing the search for abnormal conditions. Thus the abnormality indication rule base is built from the top down and not as an ad hoc mechanism to reduce the number of alarms.

The second component that aids fault management is the dynamic competition among multiple active alarm signals for limited display space in the disturbance board (when the number of active alarm signals within a spatially dedicated category exceeds the display space available within that category). The first criterion used to resolve the resulting competition is the relative severity of the messages competing for space within the category (e.g., a tank empty message is more relevant than a tank level low message). The second criterion is based on the relative priority of the competing messages within the category. This means the designer does not have to establish a priority system across all plant alarms (comparing apples and oranges) he need only establish priority with respect to a specific issue as defined by the relevant category (e.g., in a material transport process, a process disturbance indicating no flow is more relevant than a disturbance associated with a misaligned component). The third and default criterion is chronological order (display the most recent message).

The alarm system designer can tune the dynamic portion (the competition for space) of the fault management support system for a particular application by manipulating the number of subcategories with spatially dedicated locations (function nodes) within the primary categories (goal violations, etc.) and the number of display slots available within each of these dedicated categories. The minimum level of parallel presentation occurs when there are spatially dedicated locations for messages concerning major plant functions, for three categories per function (goal violations, process disturbances, and process or support unavailability), and one display slot available per category (as illustrated in function 1 of FIG. 10). From this baseline position the designer can tune the behavior of the alarm system by varying the amount and structure of the space available to display alarm messages within each function. First, he can increase the number of messages that can be seen at one time by increasing the number of message slots available for each category or subcategory (as illustrated in function 3 of FIG. 10). Since the number of spatially dedicated locations (categories) remains the same this is a second order effect. The designer can also increase the amount of parallel presentation by increasing (above three) the number of categories within the function that are allocated a spatially dedicated location on the disturbance board (as illustrated in function 2 of FIG. 10). This increase is accomplished by following the structure of the decomposition for each function. For example, consider a function in a plant whose decomposition consists of two alternative subprocesses that provide the goal, each of which requires two supports to be satisfied in order to be able to work if needed. In addition, there are two separate measures that provide data about whether the goal of the function is satisfied. The designer can assign dedicated locations to these categories as illustrated in function 2 of FIG. 10.

The filtering of alarm signals through the goal-directed structure and the constraints imposed through the competition for limited display space within categories in the structure cause the alarm system to automatically adapt to changing conditions in the plant. As plant conditions worsen the grain of display shifts to emphasize larger disturbances; the operator can then better identify where to focus his attention during the fault management process. However, there is no loss of sensitivity to small disturbances when background disturbances are sparse. This built-in adaptability to the current context of alarm signals helps the operator identify relevant data.

Figure 11:
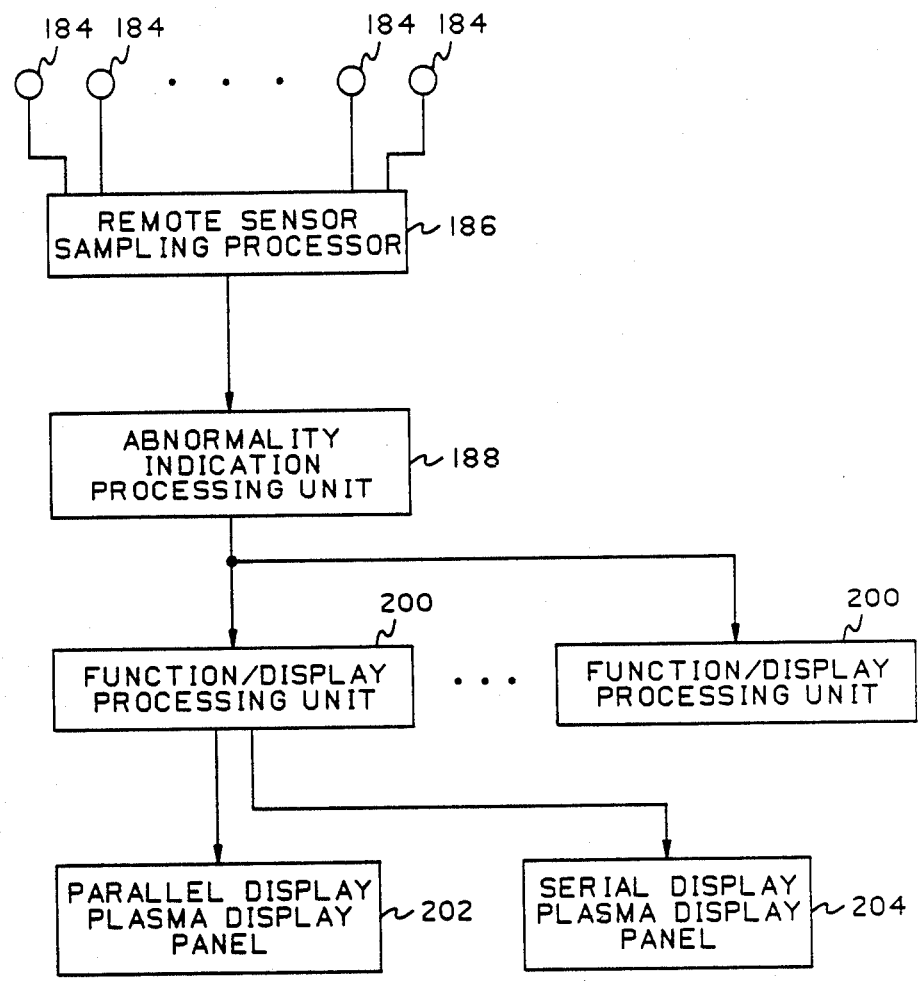
FIG. 11 is an alarm management system equipment architecture diagram.

The equipment architecture for the system illustrated in FIG. 5 could range all the way from a single centralized computer system which samples the plant sensors and formulates messages and controls the displays to a completely distributed system where each function is performed by a microcomputer. The preferred architecture for the system, when applied to a nuclear power plant, is illustrated in FIG. 11. Plant sensors 184 are sampled and conditioned by a remote sensor sampling processor 186 which can be an Intel single board computer 88/40. The single board computer 186 multiplexes the alarm signals to an abnormality indication processing unit 188 which can also be an Intel 88/40. The abnormality signals are then multiplexed or transferred to function/display processing units 200 which can be an Intel 80286 units. The function/display processing units 200 each control a plasma display panel 202 used to display the parallel messages associated with the function and a plasma display panel 204 used to display the serially ordered display messages. The display panels can each be a display panel from any of several models manufactured by Electro Plasma, Inc. The system architecture, when the present invention is applied to other systems, will be dictated by the desired system cycle time and actual hardware costs.

When designing a system in accordance with the present invention, the system designer must ask three major questions for each function within the system. As discussed with respect to FIG. 4, the goals of each function can be the requirements (support) in a higher level function even though different abnormality indicators are used at each level and, as a result, the same set of questions are iteratively asked for each function as the data (sensor signals and combinations thereof) necessary for each function is determined. That is, the present system is designed in a top down process where the ultimate goals of the system are defined first and the least important goals of the system are defined last. For each function, the designer must ask: (1) what are the goals of the function; (2) what are the processes required to achieve the goal; and (3) what are the requirements for support necessary to allow the process to operate. Within each of the major questions above, it is necessary to ask three additional questions: (a) what are the conditions which indicate a goal/process/requirement abnormality; (b) what are the sensor inputs necessary to determine the abnormality, where the determination may require some degree of calculation (threshold type analysis); and (c) how are the sensor signals combined to indicate the identified abnormality. Once these questions are answered for the highest function in the system, the process continues for less important functions until all the functions of the system are defined. Since each requirement can be a goal in a lower function, the system hierarchy is automatically produced using the above series of questions. In this manner, the sensor signals necessary to produce abnormality signals are determined, the message associated with that abnormality is determined and the priority of the message within all messages generated for that category is also determined. The actual wording of the messages for each abnormal condition within each function/category naturally results from the answers to the above questions.

Data that indicates that a goal is not satisfied can include targets, multiple limits, dynamic values and may need to take into account the action of automatic closed loop, set point control systems. In a system designed in accordance with the present invention, there is an inherent organization of the goal violations. More severe goal violations are based on values or conditions which signal a qualitative shift in consequences, needed response, or the operator's mental model of the process or process function and are determined during the design process. Measures that indicate disturbances in or unavailability of the processes that achieve a particular goal are based on functional descriptions of how those processes work.

If, after an alarm management system is installed, the operators discover a need for additional spatially dedicated function displays for functions not presently displayed, the necessary display and messages for the function can be easily created. To create the required display and messages, the three questions and their sub-questions previously discussed need to be asked by the designer to have all the information necessary to provide the display. In this manner, if desired, the number of parallel displays can be increased by dedicating display locations to progressively deeper and narrower (in terms of functional structure) levels of disturbance descriptions. Thus, the present system provides the advantage of being easily modified to accommodate new functions or additions to the process being monitored.

Even though this description has been directed to a system that manages alarms (abnormal conditions requiring attention) it would be obvious to one of ordinary skill in the art that status messages could also be built in the same manner.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An alarm management system for a controlled process, comprising:
   abnormality indication production means for sampling sensors and producing abnormality indication signals;
   dynamic alarm handling means for producing, for a plurality of functions, written abnormality messages corresponding to the abnormality indication signals, the messages corresponding to the functions of the process, each function being subdivided into a plurality of catagories and each category having a plrurality of messages, and for sorting the messages by function and by category within each function and ranking the messages by severity within each category; and
   spatially dedicated parallel display means having a spatially dedicated function display corresponding to each function and category within each function, for displaying a portion of the messages and having a limited amount of parallel display space corresponding to each category for which the messages compete.

2. A system as recited in claim 1, wherein all of the messages are held in category queues and said system further comprises serial display means for display, by category and in rank order within each category, the queues of messages.

3. A system as recited in claim 2, wherein messages move from the category queues to said parallel display means when space becomes available in the respective categories on said parallel display means due to an abnormality being resolved.

4. A system as recited in claim 3, wherein said parallel display means includes an overflow indicator for each category and said dynamic alarm handling means further includes overflow indication means for providing an overflow indication to said overflow indicator whenever messages are added to the queue and not displayed on said parallel display means.

5. A system as recited in claim 4, wherein each spatially dedicated function display includes a fixed number of goal violation message slots, a fixed number of process disturbance message slots and a fixed number of process unavailability message slots and the highest priority message appears in the highest priority slot, respectively.

6. A method of alarm management for process signals produced by process control sensors, said method comprising the steps of:
   (a) producing abnormality indication signals, from the process signals, indicative of the state of the controlled process;
   (b) producing written abnormality messages, for a plurality of functions, from the abnormality indication signals in accordance with functions of the controlled process, the messages corresponding to the functions, each function being subdivided into a plurality of categories and each category having a plurality of messages, the messages including goal violation category messages indicating whether a goal of the function is being satisfied, process disturbance category messages indicating whether the processes necessary to perform the function are operating properly and process unavailability category messsages indicaitng whether processes not currently active could work if needed;
   (c) sorting the respective category messages in accordance with a local priority and storing the messages in category queues;
   (d) displaying in spatially dedicated function locations a portion of the goal violation category messages, process disturbance category messages and process unavailability category messages having the highest priority; and
   (e) displaying the messages in the queue on a serial display by priority within category when requested.

7. A method as recited in claim 6, further comprising the step of:
   (f) moving the messages from the category queues into the spatially dedicated function locations as display space becomes available at the respective spatially dedicated function locations due to resolution of an abnormality.

8. A method as recited in claim 6, further comprising the step of:
   (f) moving the messages from the respective spatially dedicated function locations as new messages with a higher priority enter the category queues.

9. A method as recited in claim 7, wherein each spatially dedicated function location includes a limited number of display slots and said method further comprises the step of:
   (g) displaying an overflow indicator at the spatially dedicated category location whenever queue length exceeds the number of display slots for the category.

10. A method as recited in claim 9, wherein step (d) comprises the step of (di) sorting messages in the same serverity category with the same priority chronologically.

11. An alarm management system, comprising:
- a light water pressurized nuclear power plant;
- sensors coupled to said light water pressurized nuclear power plant and producing sensor signals indicating the state of said light water pressurized nuclear power plant;
- a sensor signal processor, operatively connected to said sensors, for producing state signals indicating the state of the sensors monitoring the power plant from the sensor signals and for combining the state signals using rule based algorithms to produce abnormality indication signals;
- a message processor, operatively connected to said sensor signal processor, for receiving the abnormality indication signals, generating, for a plurality of functions, written function-category messages describing the abnormal condition associated with the respective abnormality indicating signal, the messages corresponding to the functions, each function being subdivided into a plurality of categories and each category having a plurality of messages, the messages being associated with the goals of the function, processes necessary for the function and support necessary for the function, sorting the messages into goal violation, process disturbance and process unavailability category messages within each function, and ranking the messages in each category in dependence upon a predetermined local priority, outputting a portion of the messages with the highest priority and retaining the messages in priority order within category within function in category queues;
- a spatially dedicated parallel display for each function, operatively connected to said message processor, for displaying the portion of the messages simultaneously; and
- a serial display, operatively connected to said message processor, for displaying the message in the queues in priority order within category within function upon request, said message processor outputting messages from the queue to said parallel display as display space becomes available on said parallel display due to an abnormality being resolved.

12. A method of alarm management, said method comprising the steps of:
- (a) sampling sensors in a pressurized light water nuclear power plant to produce signals;
- (b) producing abnormality indication signals, from the process signals, indicative of the state of the power plant;
- (c) producing, for a plurality of functions, written abnormality messages from the abnormality indication signals in accordance with functions of the power plant, the messages corresponding to the functions, each function being subdivided into a plurality of categories and each category having a plurality of messages, the abnormality messages being produced by category within the function and including goal violation category messages idnicating whether a goal of the function is being obtained, process disturbance category messages indicating whether processes necessary to the function are operating properly and process unavailability category messages indicating whether a process not currently active could work if needed;
- (d) sorting the respective messages in accordance with a local severity priority within category within function and storing the messages in category queues;
- (e) displaying in spatially dedicated function locations a portion of the goal violation messages, process disturbance messages and process unavailability messages having the highest priority, where messages of equal rank within each category within each function are displayed chronologically ;
- (f) displaying the category queues serially in priority order by category within function upon request; and
- (g) moving messages from the category queues into the respective spatially dedicated function locations display space becomes available at the respective spatially dedicated function location due to an abnormality being resolved.

* * * * *